No. 631,440. Patented Aug. 22, 1899.
W. S. RICHARDSON.
FASTENER FOR GLOVES.
(Application filed Jan. 18, 1897.)

(No Model.)

WITNESSES:
H. T. Butler
Jm Dolon

INVENTOR:
Wm. S. Richardson
by his attys
Clarke & Raymond

UNITED STATES PATENT OFFICE.

WILLIAM S. RICHARDSON, OF BOSTON, MASSACHUSETTS, ASSIGNOR TO THE BALL AND SOCKET FASTENER COMPANY, OF SAME PLACE AND NASHUA, NEW HAMPSHIRE.

FASTENER FOR GLOVES.

SPECIFICATION forming part of Letters Patent No. 631,440, dated August 22, 1899.

Application filed January 18, 1897. Serial No. 619,566. (No model.)

*To all whom it may concern:*

Be it known that I, WILLIAM S. RICHARDSON, a citizen of the United States, residing at Boston, in the county of Suffolk and State of Massachusetts, have invented a new and useful Improvement in Fasteners for Gloves and other Articles, of which the following is a full, clear, and exact description, reference being had to the accompanying drawings, forming a part of this specification, in explaining its nature.

The invention relates to that part of the fastener known as the "ball member." It comprises an outer yielding envelop having a closed top, outwardly-rounded narrow side arms integral with and united by the top, bent inward to form a neck, thence outward to form a sectional flange, and again inward about the outer edge of an annular plate or washer. The hole in the washer while concentric with the cavity of the ball is slightly smaller than the cavity at the neck, thus providing a flange adapted to be used in fastening the ball member to a glove or other article with the fastening described in my Patent No. 446,139, dated February 10, 1891.

Figure 1:
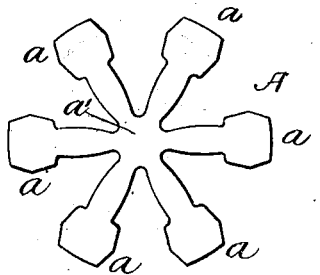
Figure 2:
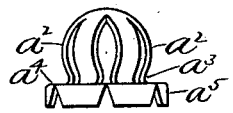
Figure 3:
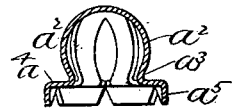
Figure 4:
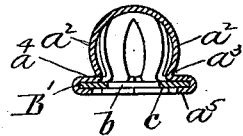
Figure 5:
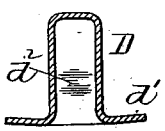
Figure 6:
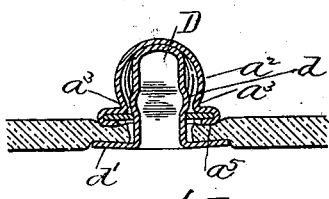
Figure 7:
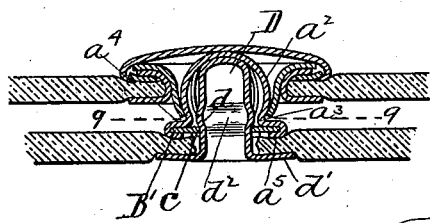
Figure 8:
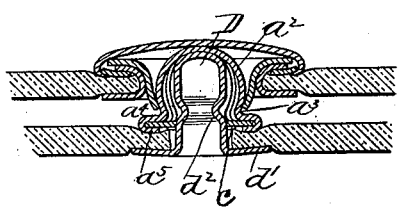
Figure 9:
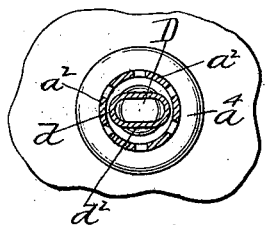

In the drawings, Figure 1 represents a blank from which the envelop of the ball is made. Fig. 2 shows a partially-completed ball in elevation. Fig. 3 is a vertical section of the ball member as represented in Fig. 2. Fig. 4 is a view in section representing the ball as combined with an annular plate. Fig. 5 is a view in vertical section of the fastening used for uniting the ball member to the material. Fig. 6 shows the ball member and said fastening as combined with the material. Fig. 7 is a view representing the ball member as engaging a socket member. Fig. 8 is a view of the ball and socket members of Fig. 7 upon a section at a right angle to that represented in Fig. 7. Fig. 9 is a view in horizontal section upon the dotted line 9 9 of Fig. 8.

A represents the blank. It is punched from flat sheet metal, and it may have any desired number of arms $a$, radiating from a common center $a'$. The blank is shaped to make the part $a'$ the top of the wall and to cause the arms $a$ to form outwardly-rounded sides $a^2$, the neck $a^3$, flange $a^4$, and the depending sections $a^5$, which are bent about the edge and beneath the under surface of the annular plate B, having a central hole $b$, and thus producing the structure represented in Fig. 4. The edge $c$ of the annular plate about the hole $b$ extends slightly beyond the smallest bore of the ball, which is at the neck, and this forms a flange which is adapted to receive upon its inner surface the fastening projection $d$ of the fastening D. This fastening is hollow, has a preformed flange $d'$, and is provided in advance with the indentations $d^2$. The making of these indentations $d^2$ in the opposite walls of the fastener causes corresponding bulges therein, and when pressure is applied to both ends of the fastening the fastening will shorten, the indentations becoming deeper and the bulges projecting more.

To attach the ball to the glove or material, a properly-proportioned fastening of this character is inserted through a hole formed in the material and through the opening $b$ of the washer into the cavity of the ball. Pressure being applied to both ends of the fastening, bulges will more fully develop, which engage with the inner surface of the annular plate B and lock or fasten the plate and ball to the material, a tubular fastening-stem being thereby formed, passing from the flange $d'$ through the opening in the plate, and the fastening extends in the cavity of the ball from the point where it bulges or enlarges to the closed top of the outer yielding envelop.

Having thus fully described my invention, I claim and desire to secure by Letters Patent of the United States—

A ball member of a ball-and-socket fastener comprising an outer yielding envelop having a closed top, outwardly-rounded narrow side arms integral with and united by the top, which side arms are bent inward to form the neck $a^3$, are widened at their outer end, are bent outward to form an uncovered sectional flange $a^4$ and then inward about the outer edge of and under an annular plate, said annular plate having an annulus of smaller bore than the neck of the yielding envelop, whereby a narrow fastening-ledge below the neck of said envelop is formed, a fastening for attaching the envelop and plate made in one piece having a preformed outer flange and a long tubular section extending from said preformed flange through the hole in said flat plate to the closed top of the outer yielding envelop, portions of the sides of which tubular section are folded outward above said annular plate to lap upon the inner surface of said ledge and thus serve to clamp it directly to the material and against the preformed flange, as and for the purposes set forth.

WILLIAM S. RICHARDSON.

Witnesses:
F. F. RAYMOND, 2d,
J. M. DOLAN.